US012782642B2

(12) United States Patent
Sakurai

(10) Patent No.: US 12,782,642 B2
(45) Date of Patent: Nov. 3, 2026

(54) OPTICAL SWITCH

(71) Applicant: SANTEC HOLDINGS CORPORATION, Aichi (JP)

(72) Inventor: Yasuki Sakurai, Aichi (JP)

(73) Assignee: SANTEC HOLDINGS CORPORATION, Aichi (JP)

( * ) Notice: Subject to any disclaimer, the term of this patent is extended or adjusted under 35 U.S.C. 154(b) by 272 days.

(21) Appl. No.: 18/832,235

(22) PCT Filed: Feb. 24, 2023

(86) PCT No.: PCT/JP2023/006797
§ 371 (c)(1),
(2) Date: Jul. 23, 2024

(87) PCT Pub. No.: WO2024/176451
PCT Pub. Date: Aug. 29, 2024

(65) Prior Publication Data

US 2026/0177751 A1 Jun. 25, 2026

(51) Int. Cl.
*G02B 6/26* (2006.01)
*G02B 5/00* (2006.01)
(Continued)

(52) U.S. Cl.
CPC ........... *G02B 6/3594* (2013.01); *G02B 5/003* (2013.01); *G02B 6/3512* (2013.01);
(Continued)

(58) Field of Classification Search
CPC .... G02B 6/3594; G02B 5/003; G02B 6/3512; G02B 6/3526; G02B 6/26; G02B 26/0833; G02F 1/133538
See application file for complete search history.

(56) References Cited

U.S. PATENT DOCUMENTS 7,362,434 B2 * 4/2008 Kobayashi ........... G02B 6/2931 359/290
8,351,789 B2 * 1/2013 Wagener .............. G02B 6/3512 359/223.1

(Continued)

FOREIGN PATENT DOCUMENTS

JP 2015031787 A 2/2015
JP 2017520787 A 7/2017

OTHER PUBLICATIONS

IPRP issued in PCT/JP2023/006797 dated Sep. 4, 2025.

(Continued)

*Primary Examiner* — Jennifer Doan
(74) *Attorney, Agent, or Firm* — Meunier Carlin & Curfman LLC

(57) ABSTRACT

An optical switch includes one or more multi-core fibers, a lens, a liquid crystal polarization grating, and a MEMS tilt mirror array. In the MEMS tilt mirror array, each of multiple MEMS tilt mirrors is configured to switch a propagation path of an input light from a corresponding core so as to reflect the input light from the corresponding core at a tilt angle controlled by a controller and propagates a corresponding reflected light to a core selected by the controller. The liquid crystal polarization grating is arranged so that the input light from a core corresponding to each of the multiple MEMS tilt mirrors passes through the liquid crystal polarization grating and is incident on a corresponding MEMS tilt mirror as a zeroth order diffracted light.

8 Claims, 6 Drawing Sheets

(51) Int. Cl.
*G02B 6/35* (2006.01)
*G02B 26/08* (2006.01)
*G02F 1/1335* (2006.01)

(52) U.S. Cl.
CPC ....... *G02B 6/3526* (2013.01); *G02B 26/0833* (2013.01); *G02F 1/133538* (2021.01)

(56) References Cited

U.S. PATENT DOCUMENTS

| | | | | |
|---|---|---|---|---|
| 2013/0272650 | A1* | 10/2013 | Ishikawa ............ | H04Q 11/0005<br>385/17 |
| 2015/0023662 | A1 | 1/2015 | Suzuki et al. | |
| 2016/0360301 | A1 | 12/2016 | Li | |
| 2017/0075189 | A1 | 3/2017 | Mao et al. | |

OTHER PUBLICATIONS

Jinno, Masahiko, “Core Selective Switch With Low Insertion Loss Over Ultra-Wide Wavelength Range for Spatial Channel Networks,” Journal of Lightwave Technology, vol. 40, No. 6, Mar. 15, 2022.
International Search Report dated May 9, 2023, Application No. PCT/JP2023/006797.
Written Opinion of International Searching Authority dated May 9, 2023, Application No. PCT/JP2023/006797.

* cited by examiner

OPTICAL SWITCH

TECHNICAL FIELD

The present disclosure relates to an optical switch.

BACKGROUND ART

Along with an increase in speed of mobile communication, a communication traffic of a backbone optical network continues to increase in recent years. With the present optical link using a single-mode fiber (SCF), it is difficult to continuously meet the increasing traffic demand. Therefore, a space division multiplexing (SDM) network that uses a multi-mode fiber (MCF) has been proposed.

The SDM network comprises a SDM layer that uses channel routing by MCF-based space division, in addition to a wavelength division multiplexing (WDM) layer that uses the SCF.

Recently, as a space cross-connect (SXC) architecture that uses the MCF, a simple and economically efficient SXC architecture based on a core selective switch (CSS) is proposed (for example, see Non-Patent Document 1).

PRIOR ART DOCUMENTS

Non-Patent Documents

Non-Patent Document 1: JINNO Masahiko, et al., "Core selective switch with low insertion loss over ultra-wide wavelength range for spatial channel networks, Journal of Lightwave Technology, U.S., Mar. 15, 2022, Vol. 40, No. 6, p. 1822-p. 1828

SUMMARY OF THE INVENTION

Problems to be Solved by the Invention

The proposed core selective switch employs a MEMS tilt mirror, as a switching element, which has low optical loss, wide bandwidth, low power consumption, and excellent scalability. By controlling a voltage applied to the MEMS tilt mirror, a tilt angle of the MEMS tilt mirror is controlled. Through the control of the tilt angle, a core of a multi-core fiber as an output destination is selected.

In addition, it is common for the optical switch disposed on the node to be provided with a light attenuation function in order to cancel different optical losses depending on the propagation path, wavelength dependence of an optical amplifier, and port dependence of the optical amplifier.

In the conventional optical switch that uses the MEMS tilt mirror, the tilt angle of the MEMS tilt mirror is controlled to deliberately lower a coupling rate to an output optical fiber core in order to implement the light attenuation function. However, in the light attenuation method as above, light leaks to adjacent cores in a high-density optical switch with a number of cores, and crosstalk performance deteriorates.

According to one aspect of the present disclosure, it is desirable to provide a technique that can improve crosstalk performance of an optical switch for multi-core fiber.

Means for Solving the Problems

An optical switch according to one aspect of the present disclosure comprises a connector to which one or more multi-core fibers are coupled, a lens, a liquid crystal polarization grating, and a MEMS tilt mirror array. The one or more multi-core fibers each comprise multiple cores. The MEMS tilt mirror array comprises multiple MEMS tilt mirrors.

The lens is arranged so that input lights from the one or more multi-core fibers coupled to the connector pass through the lens. Specifically, the lens is arranged so that, to each of the multiple MEMS tilt mirrors, the light input from a corresponding one of the multiple cores propagates.

Each of the multiple MEMS tilt mirrors is configured to reflect the input light from a corresponding core at a tilt angle controlled by the controller. As a result, each of the multiple MEMS tilt mirrors is configured to switch a propagation path of the input light so that a corresponding reflected light propagates to one of the multiple cores selected by the controller.

The liquid crystal polarization grating is arranged so that the light input from a core corresponding to each of the multiple MEMS tilt mirrors passes through the liquid crystal polarization grating and is incident on a corresponding MEMS tilt mirror as a zeroth order diffracted light (that is, a zeroth light). The liquid crystal polarization grating is controlled by the controller, and is configured to be able to change intensity of the zeroth order diffracted light.

According to the optical switch configured as such, without deliberately controlling the tilt angle of the MEMS tilt mirror so as to lower the coupling rate to the output optical fiber core, the intensity of light that propagates to the output optical fiber core can be adjusted by the control of the liquid crystal polarization grating. Thus, according to one aspect of the present disclosure, an optical switch for multi-core fiber excellent in crosstalk performance can be provided.

According to one aspect of the present disclosure, the liquid crystal polarization grating may be configured to be able to independently control the intensity of the zeroth order diffracted light that is incident on each of the multiple MEMS tilt mirrors through the liquid crystal polarization grating. For this purpose, the liquid crystal polarization grating may comprise multiple independent drive electrodes.

According to this optical switch, each of the input lights can be attenuated at an individual attenuation rate adapted to the input light and output from a corresponding core. Thus, convenience of the optical switch is improved.

According to one aspect of the present disclosure, the lens may comprise a condenser lens for condensing the input light that propagates to each of the multiple MEMS tilt mirrors. In this case, the liquid crystal polarization grating may be arranged between the condenser lens and the MEMS tilt mirror array.

Since the input lights pass through the liquid crystal polarization grating at the stage when the input lights are condensed and their beam diameters have changed to be smaller, adjacent input lights can be inhibited from passing through the liquid crystal polarization grating in a spatially overlapping state. As a result, deterioration of crosstalk can be inhibited, and the attenuation rate of each channel can be accurately controlled.

According to one aspect of the present disclosure, the optical switch may comprise a light shield. The light shield may comprise an opening portion and a shielding portion. While the light shield causes a zeroth order diffracted light generated at the liquid crystal polarization grating to propagate to the MEMS tilt mirror array through the opening portion, the light shield may be configured to inhibit propagation of a diffracted light of the first order or higher generated at the liquid crystal polarization grating to the MEMS tilt mirror array by the shielding portion. The light shield may be provided between the liquid crystal polarization grating and the MEMS tilt mirror array.

According to the optical switch comprising the light shield, deterioration of crosstalk due to the diffracted light of the first order or higher can be inhibited.

EXPLANATION OF REFERENCE NUMERALS

1 . . . optical network, 10 . . . core selective switch, 20 . . . multi-core fiber, 30 . . . MCF array, 40 . . . micro lens array, 41 . . . micro lens, 50 . . . condenser lens, 60 . . . liquid crystal polarization grating, 61 . . . drive electrode, 65 . . . area, 70 . . . aperture plate, 71 . . . opening portion, 75 . . . shielding portion, 80 . . . MEMS tilt mirror array, 81 . . . MEMS tilt mirror, 90 . . . controller.

MODE FOR CARRYING OUT THE INVENTION

Example embodiments of the present disclosure will be described hereinafter with reference to the accompanying drawings.

Figure 1:
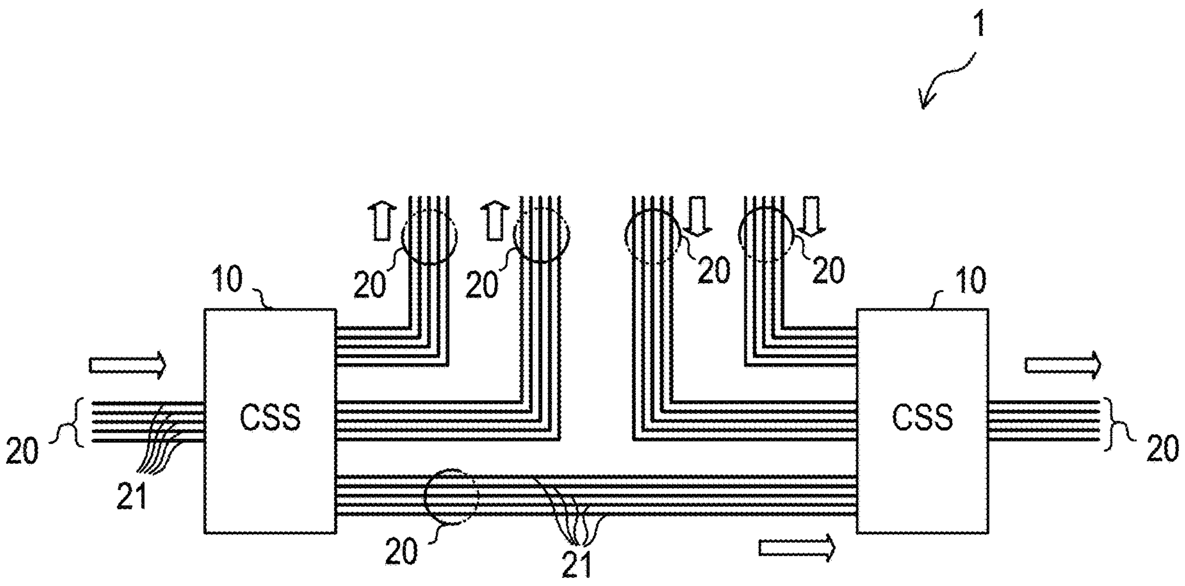
FIG. 1 is an explanatory diagram of an example installation of core selective switches in an optical network.

A core selective switch (CSS) 10 shown in FIG. 1 of the present embodiment is an optical switch installed on a node of an optical network 1 constructed using multi-core fibers (MCF) 20 in place of single-mode fibers (SMF).

Each of the multi-core fibers 20 is an optical fiber comprising multiple cores 21 in a clad. The core selective switch 10 of the present embodiment is coupled to the multiple multi-core fibers 20, and is configured to be able to switch a propagation path of an optical signal on a core-by-core basis between an input MCF and an output MCF.

The input MCF corresponds to one or more multi-core fibers 20, among the multiple multi-core fibers 20, which input the optical signal to the core selective switch 10. The output MCF corresponds to one or more multi-core fibers 20, among the multiple multi-core fibers 20, which output the optical signal from the core selective switch 10 to the outside.

Figure 2:
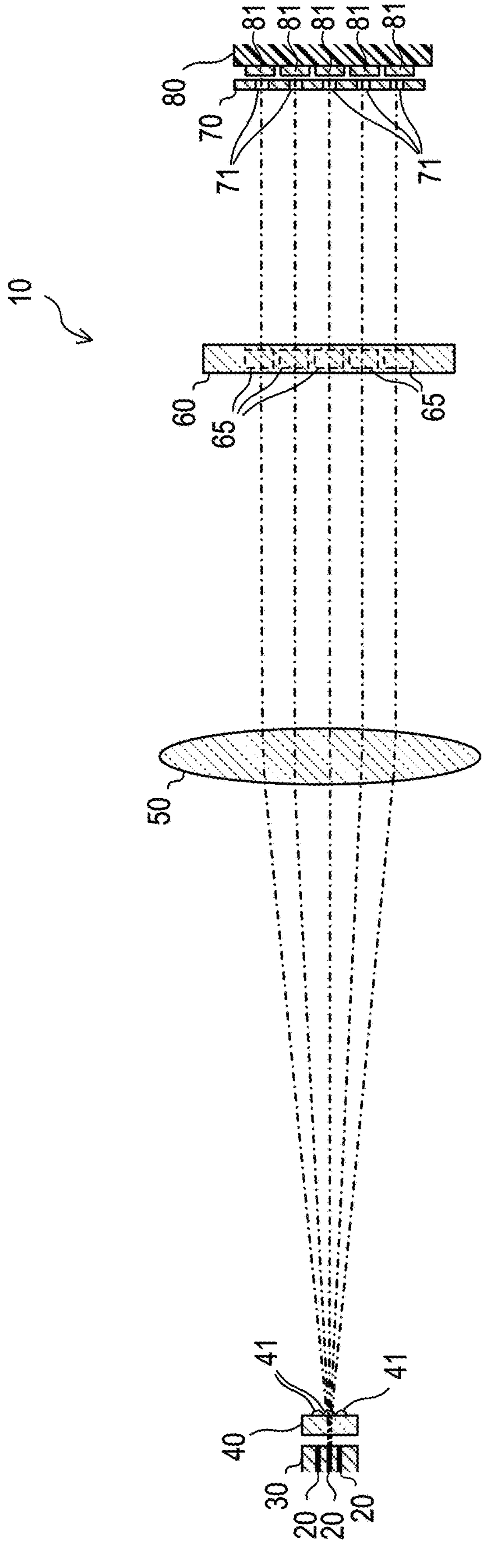
FIG. 2 is an explanatory view of an optical configuration of the core selective switch.

The core selective switch 10 shown in FIG. 2 comprises a MCF array 30, a micro lens array 40, a condenser lens 50, a liquid crystal polarization grating (LCPG) 60, an aperture plate 70, and a MEMS tilt mirror array 80, as elements of an optical system. Dash-dotted lines in FIG. 2 schematically show the propagation paths of input lights to the MEMS tilt mirror array 80. MEMS is an abbreviation of Micro Electro Mechanical Systems.

Figure 3:
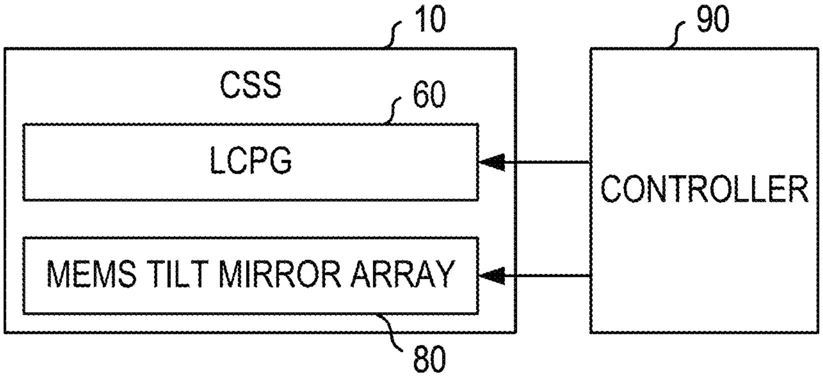
FIG. 3 is an explanatory diagram of a controller that controls the core selective switch.

As shown in FIG. 3, the controller 90 is coupled to the core selective switch 10. The controller 90 is coupled to the liquid crystal polarization grating 60 and the MEMS tilt mirror array 80 so that the controller 90 can control the liquid crystal polarization grating 60 and the MEMS tilt mirror array 80.

Figure 4:
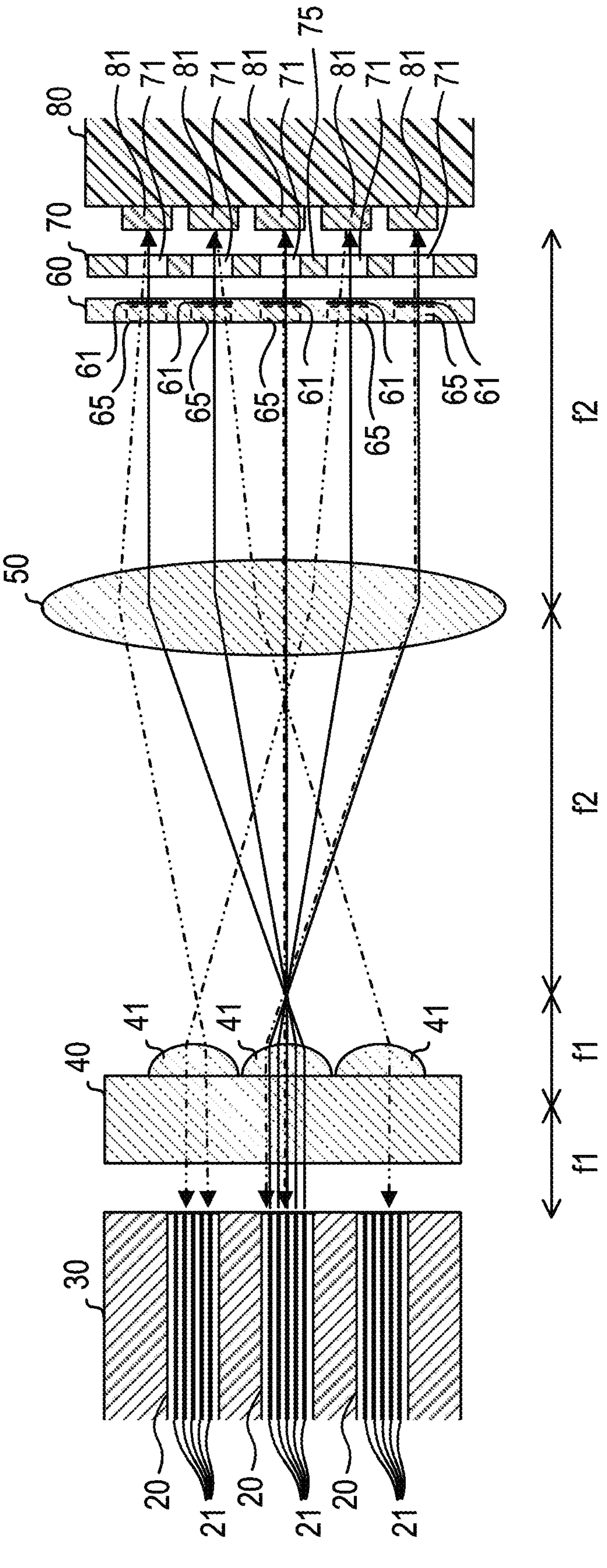
FIG. 4 is a conceptual explanatory view of optical switching in the core selective switch.

FIG. 4 conceptually explains optical switching implemented in the core selective switch 10. Solid line arrows in FIG. 4 conceptually illustrate propagation of the input lights input from the outside through the input MCF. Two-dot chain line arrows in FIG. 4 conceptually illustrate propagation of reflected lights corresponding to the input lights that come from the MEMS tilt mirror array 80 and output to the outside through the output MCF.

The MCF array 30 functions as a connector with the multi-core fibers 20. The multiple multi-core fibers 20 are coupled and fixed to the MCF array 30. At least a portion of these multiple multi-core fibers 20 function as the aforementioned input MCF. At least a portion of the multiple multi-core fibers 20 function as the aforementioned output MCF.

Figure 5:
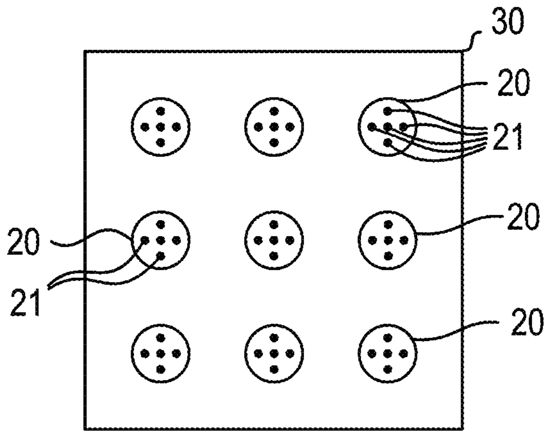
FIG. 5 is a plan view explaining two-dimensional arrangement of multi-core fibers in a plane perpendicular to an optical axis.

The multiple multi-core fibers 20 may include a multi-core fiber 20 that functions as both the input MCF and the output MCF. In an example MCF array 30, as shown in FIG. 5, nine multi-core fibers 20 are arranged in a two-dimensional array in a plane perpendicular to an optical axis. Each of the multi-core fibers 20 illustrated in FIG. 5 has five cores 21.

The micro lens array 40 comprises multiple micro lenses 41. In the micro lens array 40, the multiple micro lenses 41 are arranged in a two-dimensional array that corresponds to the two-dimensional array of the multi-core fibers 20 in the MCF array 30. Each of the micro lenses 41 functions as a collimator.

Each micro lens 41 is associated with one of the multiple multi-core fibers 20. In other words, each micro lens 41 is arranged in a path through which the input light from a corresponding one of the multiple multi-core fibers 20 or the output light to a corresponding one of the multi-core fibers 20 propagates.

The input light from each core 21 of the input MCF is converted to a collimated light by the corresponding micro lens 41, which is then incident on the condenser lens 50. A position of incidence on the condenser lens 50 differs for each core 21. In FIG. 4, the middle multi-core fiber 20 among the three multi-core fibers 20 shown corresponds to the input MCF.

The optical system of the core selective switch 10 is configured as a 4f optical system that uses the micro lens array 40 and the condenser lens 50. Accordingly, a core pitch and a core MFD (mode field diameter) in the multi-core fiber 20 are magnified by a magnification M (=f2/f1) on a reflection surface of the MEMS tilt mirror array 80. Here, f1 indicates a focal length of the micro lens 41, and f2 indicates a focal length of the condenser lens 50.

The condenser lens 50 is arranged to form a telecentric optical system. The input lights from the input MCF are deflected through the condenser lens 50 so that lights that have passed through the condenser lens 50 are parallel to a principal ray (main axis) of the condenser lens 50, and condensed to be focused at a focal position of the condenser lens 50.

The MEMS tilt mirror array 80 is arranged to have the reflection surface at the focal position. The MEMS tilt mirror array 80 comprises, as the multiple MEMS tilt mirrors 81, the same number or more of MEMS tilt mirrors 81 as the number of cores of the input MCF.

The multiple MEMS tilt mirrors 81 are provided on an imaging plane of the input lights from the condenser lens 50.

When the input MCF is the multiple multi-core fibers 20, the same number or more of MEMS tilt mirrors 81 as the number of cores of the multiple multi-core fibers 20 corresponding to the input MCF are provided in the MEMS tilt mirror array 80.

Each MEMS tilt mirror 81 is arranged at a position where the input light from the corresponding one of cores 21 that propagates through the condenser lens 50 is condensed. In other words, in the MEMS tilt mirror array 80, the multiple MEMS tilt mirrors 81 are arranged in a two-dimensional array in a magnified pattern of a two-dimensional array of the cores 21 of the input MCF.

Tilt angles of the MEMS tilt mirrors 81 are controlled by the controller 90. The controller 90 is coupled to the MEMS tilt mirror array 80 so that the controller 90 can individually control a voltage applied to each of the multiple MEMS tilt mirrors 81.

Due to the control of the applied voltage by the controller 90, the tilt angle of each of the MEMS tilt mirrors 81 is individually controlled to a tilt angle that corresponds to an output core. The output core herein refers to the core 21 of the output MCF to which a reflected light should be optically coupled.

Each MEMS tilt mirror 81 reflects the input light from the corresponding one of cores 21 at the tilt angle controlled by the controller 90. In accordance with the tilt angle, the reflected light propagates to the core 21 selected by the controller 90, among the multiple cores 21 included in the output MCF, that is, the aforementioned output core, and is output, as an output light, from the core 21 to the outside of the core selective switch 10.

In addition, the liquid crystal polarization grating 60 is provided between the condenser lens 50 and the MEMS tilt mirror array 80.

In the multi-core fiber 20, the multiple cores 21 are arranged in high density. Thus, the input lights from the respective cores 21 of the input MCF spatially overlap until the input lights approach the MEMS tilt mirror array 80.

Due to the condensed light through the condenser lens 50, the input light from each core 21 is completely separated from the input light of the adjacent core 21 near the MEMS tilt mirror array 80, and is incident on the corresponding MEMS tilt mirror 81. The liquid crystal polarization grating 60 is arranged at a position especially near the MEMS tilt mirror array 80 where the input light of each core 21 is completely separated.

The liquid crystal polarization grating 60 attenuates the intensity of the input light from each core 21 of the input MCF towards the MEMS tilt mirror array 80 at an attenuation rate in accordance with the applied voltage. The attenuated input light propagates to the MEMS tilt mirror array 80.

The liquid crystal polarization grating 60 comprises multiple independent drive electrodes 61 arranged in a two-dimensional array in the same pattern as that of the multiple MEMS tilt mirrors 81. Applied voltages to the multiple drive electrodes 61 are individually controlled by the controller 90.

Through the voltage control to the multiple drive electrodes 61, individual voltages are applied to multiple areas 65 arranged in accordance with the aforementioned pattern of the liquid crystal polarization grating 60. As a result, in the multiple areas 65 of the liquid crystal polarization grating 60, lights passing though the areas 65 attenuate at attenuation rates in accordance with the individual voltages applied to the areas 65.

Figure 6A:
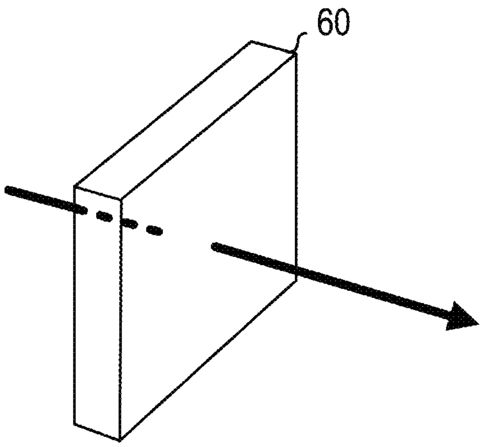
FIG. 6A is an explanatory view of transmission of light in a liquid crystal polarization grating in a state where voltage is not applied.

As shown in FIG. 6A, when voltage is not applied to the liquid crystal polarization grating 60, the liquid crystal polarization grating 60 does not actually function as a diffraction grating, and the light incident on the liquid crystal polarization grating 60 is output as a transmitted light (that is, zeroth order diffracted light).

Figure 6B:
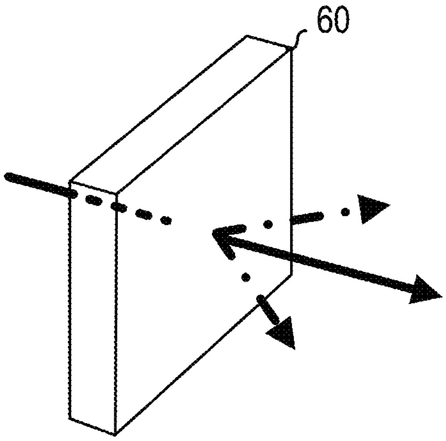
FIG. 6B is an explanatory view of diffraction of light in the liquid crystal polarization grating in a state where voltage is applied.

On the other hand, as shown in FIG. 6B, when voltage is applied to the liquid crystal polarization grating 60, the more the applied voltage increases, the more the first order or higher diffracted light components increase and the more the intensity of the zeroth order diffracted light decreases. Lights that pass through the liquid crystal polarization grating 60 based on this principle attenuate and propagate to the MEMS tilt mirror array 80.

As above, the liquid crystal polarization grating 60 is configured to be able to independently adjust or change the intensity of the input light, when the input light that propagates from each core 21 of the input MCF towards the corresponding MEMS tilt mirror 81 passes through the liquid crystal polarization grating 60.

In addition, the liquid crystal polarization grating 60 is a transmission-type device, and diffracts a light in an outward path and a return path of the light. Thus, the liquid crystal polarization grating 60 is designed and arranged to achieve diffraction angles at which both the first order diffracted light generated in the outward path and the first order diffracted light generated in the return path do not couple with the core 21 of the multi-core fiber 20.

In addition, if the diffracted lights hit inappropriate spots on the MEMS tilt mirror array 80, light scattering may occur in unintended directions and the scattered light may induce unintended coupling with the cores 21, thereby deteriorating crosstalk.

The aperture plate 70 is provided between the liquid crystal polarization grating 60 and the MEMS tilt mirror array 80, in order to inhibit such deterioration of crosstalk deriving from the scattered light. In other words, the aperture plate 70 is arranged to block the unnecessary diffracted lights of the first order or higher of the liquid crystal polarization grating 60, so that the diffracted lights do not couple with the multi-core fibers 20.

Specifically, the aperture plate 70 is configured such that multiple opening portions 71 are formed on a plate-shaped light shield. The multiple opening portions 71 are provided on the aperture plate 70 in a two-dimensional array that corresponds to the two-dimensional array of the MEMS tilt mirrors 81, and define through holes.

Each opening portion 71 is provided in a propagation path to the corresponding MEMS tilt mirror 81 of an input light from the corresponding core 21 of the input MCF, which passes through the liquid crystal polarization grating 60 as a zeroth order diffracted light, so that the input light propagates to the corresponding MEMS tilt mirror 81 without being blocked by the aperture plate 70.

A shielding portion 75, which is a portion of the aperture plate 70 other than the opening portion 71, is arranged to block the propagation path to the MEMS tilt mirror array 80 of the diffracted lights of the first order or higher generated in the liquid crystal polarization grating 60. This causes the shielding portion 75 to inhibit the propagation of the diffracted lights of the first order or higher to the MEMS tilt mirror array 80.

In the core selective switch 10 configured as above, the input light from each core 21 of the input MCF passes through the corresponding micro lens 41 and condenser lens 50, and is incident on the corresponding area 65 of the liquid crystal polarization grating 60. The input light, when passing through the liquid crystal polarization grating 60 as the zeroth order diffracted light, attenuates the attenuation rate in accordance with a voltage applied to the corresponding area 65. The applied voltage is controlled by the controller 90.

The input light that has been attenuated through the liquid crystal polarization grating 60 passes through the opening portion 71 of the aperture plate 70, and is incident on the corresponding MEMS tilt mirror 81. At this time, the diffracted lights of the first order or higher of the liquid crystal polarization grating 60 are blocked by the shielding portion 75 of the aperture plate 70, and inhibited from propagating to the MEMS tilt mirror array 80.

The light that has been incident on the MEMS tilt mirror 81 reflects on the reflection surface in a direction that is in accordance with the tilt angle of the MEMS tilt mirror 81. The reflected light is optically coupled to the output core, which is a core 21 of the output MCF selected by the controller 90 through the control of the tilt angle of the corresponding MEMS tilt mirror 81.

The reflected light passes through the liquid crystal polarization grating 60 through the opening portion 71 of the aperture plate 70 from the reflection surface of the MEMS tilt mirror 81. The reflected light is again attenuated when passing through the liquid crystal polarization grating 60.

The reflected light that has passed through the liquid crystal polarization grating 60 is incident on the output core through the condenser lens 50 and the corresponding micro lens 41. The light incident on the output core propagates to the outside of the core selective switch 10 through the output core.

According to the core selective switch 10 of the present embodiment described above, the light attenuation function is achieved by the liquid crystal polarization grating 60. The liquid crystal polarization grating 60 comprises the multiple drive electrodes 61, and is configured to be able to attenuate the input light input from each core 21 of the input MCF at the individual attenuation rate. The liquid crystal polarization grating 60 can independently control the intensity of the zeroth order diffracted light that is incident on each of the multiple MEMS tilt mirrors 81 through the liquid crystal polarization grating 60.

A conventional light attenuation method known in the field of optical switches is, for example, a method of controlling the tilt angle of the MEMS tilt mirror 81 to deliberately lower the coupling rate to the output optical fiber. However, this method cannot inhibit a phenomenon of light leaking to adjacent optical fibers and/or cores 21 in an optical switch in which the optical fibers and/or cores 21 are arranged in high density, and deteriorates crosstalk performance.

As another light attenuation method, a method of adjusting a polarization angle or a deflection angle of light output from a liquid crystal element by controlling a voltage applied to a liquid crystal element, thereby adjusting a coupling rate to an output optical fiber is known. However, a liquid crystal element generally has strong polarization dependence.

In order to cope with an unexpected polarization state of light input to an optical switch, the conventional methods separate the light input to the optical switch into two orthogonal linearly polarized lights by using polarization diversity. Thereafter, by using a $\lambda/2$ wave plate, one of the linearly polarized lights is converted to the other of the linearly polarized lights, and input to the liquid crystal element.

Accordingly, in the conventional methods, the optical system has many components. Further, since two different optical paths have to be operated in the optical system, the optical system tends to become larger. Moreover, the optical system has the disadvantage of being susceptible to aberrations of optical lenses or the like.

On the other hand, the liquid crystal polarization grating 60 has a property independent of the polarization state of an incident light. The liquid crystal polarization grating 60 has a structure in which orientation directions of liquid crystal molecules periodically change. Using the optical anisotropy, the liquid crystal polarization grating 60 can be operated as a polarization-independent diffraction element.

The liquid crystal polarization grating 60 in a state with no voltage applied does not function as a diffraction grating, and the incident light travels in a straight line without diffraction. Accordingly, in this state, the input light is optically coupled to a desired output core without light attenuation.

On the other hand, in a case of the liquid crystal polarization grating 60 with voltage applied, a modulation degree of diffraction grating becomes stronger in accordance with the applied voltage, the light intensity of the first order diffracted light increases, and the light intensity of the zeroth order diffracted light decreases. Therefore, by controlling the applied voltage to the liquid crystal polarization grating 60, the light intensity of the zeroth order diffracted light that is the input light optically coupled to the output core can be adjusted as desired.

In the present embodiment, this liquid crystal polarization grating 60 is arranged at a position where all optical axes of the telecentric optical system of the core selective switch 10 are parallel. In the present embodiment, by controlling the voltage of the liquid crystal polarization grating 60 in this arrangement, a portion of the input light is diffracted as the first order diffracted light. As a result, the intensity of the zeroth order diffracted light coupled to the output core is adjusted, and the light attenuation function is achieved. Further in the present embodiment, in order to inhibit the influence of the diffracted light of the first order or higher, the aperture plate 70 is provided adjacent to the MEMS tilt mirror array 80.

According to the present embodiment, deterioration of crosstalk performance by the light attenuation function can be inhibited, and an optical switch for the multi-core fibers 20 excellent in crosstalk performance can be provided.

Other Embodiments

The present disclosure is not limited to the aforementioned embodiment, and may take various modes. For example, the number of the multi-core fibers 20 or the number of cores thereof shown in the drawings is merely an example. The present disclosure may be applied to an optical switch comprising any number of multi-core fibers 20.

Functions of one element in the aforementioned embodiments may be achieved by two or more elements. Functions of two or more elements in the aforementioned embodiments may be achieved by one element. A part of the configuration of the aforementioned embodiments may be omitted. It should be noted that any and all forms that are encompassed in the technical ideas identified by the languages in the claims are embodiments of the present disclosure.

The invention claimed is:

1. An optical switch comprising:

a connector to which one or more multi-core fibers each comprising multiple cores are coupled;

a lens arranged so that input lights from the one or more multi-core fibers coupled to the connector passes through the lens;

a liquid crystal polarization grating; and a MEMS tilt mirror array comprising multiple MEMS tilt mirrors, the lens being arranged so that, to each of the multiple MEMS tilt mirrors, an input light propagates from a corresponding one of the multiple cores, each of the multiple MEMS tilt mirrors being configured to switch a propagation path of the input light from a corresponding core so that, by reflecting the input light from the corresponding core at a tilt angle controlled by a controller, a corresponding reflected light propagates to a core of the multiple cores selected by the controller, the liquid crystal polarization grating being arranged so that the input light from a core corresponding to each of the multiple MEMS tilt mirrors is incident on a corresponding MEMS tilt mirror through the liquid crystal polarization grating as a zeroth order diffracted light, and the liquid crystal polarization grating being controlled by the controller, and configured to be able to change intensity of the zeroth order diffracted light.

2. The optical switch according to claim 1, wherein the liquid crystal polarization grating comprises multiple independent drive electrodes so as to be able to independently control the intensity of the zeroth order diffracted light incident on each of the multiple MEMS tilt mirrors through the liquid crystal polarization grating.

3. The optical switch according to claim 1, wherein the lens comprises a condenser lens for condensing the input light that propagates to each of the multiple MEMS tilt mirrors, and the liquid crystal polarization grating is arranged between the condenser lens and the MEMS tilt mirror array.

4. The optical switch according to claim 1 comprising:

a light shield comprising an opening portion and a shielding portion, the light shield being arranged between the liquid crystal polarization grating and the MEMS tilt mirror array and configured to propagate the zeroth order diffracted light generated in the liquid crystal polarization grating to the MEMS tilt mirror array through the opening portion, and inhibit propagation of a diffracted light of the first order or higher generated in the liquid crystal polarization grating to the MEMS tilt mirror array by the shielding portion.

5. The optical switch according to claim 2, wherein the lens comprises a condenser lens for condensing the input light that propagates to each of the multiple MEMS tilt mirrors, and the liquid crystal polarization grating is arranged between the condenser lens and the MEMS tilt mirror array.

6. The optical switch according to claim 2 comprising:

a light shield comprising an opening portion and a shielding portion, the light shield being arranged between the liquid crystal polarization grating and the MEMS tilt mirror array and configured to propagate the zeroth order diffracted light generated in the liquid crystal polarization grating to the MEMS tilt mirror array through the opening portion, and inhibit propagation of a diffracted light of the first order or higher generated in the liquid crystal polarization grating to the MEMS tilt mirror array by the shielding portion.

7. The optical switch according to claim 3 comprising:

a light shield comprising an opening portion and a shielding portion, the light shield being arranged between the liquid crystal polarization grating and the MEMS tilt mirror array and configured to propagate the zeroth order diffracted light generated in the liquid crystal polarization grating to the MEMS tilt mirror array through the opening portion, and inhibit propagation of a diffracted light of the first order or higher generated in the liquid crystal polarization grating to the MEMS tilt mirror array by the shielding portion.

8. The optical switch according to claim 5 comprising:

a light shield comprising an opening portion and a shielding portion, the light shield being arranged between the liquid crystal polarization grating and the MEMS tilt mirror array and configured to propagate the zeroth order diffracted light generated in the liquid crystal polarization grating to the MEMS tilt mirror array through the opening portion, and inhibit propagation of a diffracted light of the first order or higher generated in the liquid crystal polarization grating to the MEMS tilt mirror array by the shielding portion.

* * * * *